United States Patent

Tangemann et al.

Patent Number: 6,008,759
Date of Patent: Dec. 28, 1999

[54] METHOD OF DETERMINING THE DIRECTION OF ARRIVAL OF A RADIO SIGNAL, AS WELL AS RADIO BASE STATION AND RADIOCOMMUNICATIONS SYSTEM

[75] Inventors: Michael Tangemann, Leonberg; Cornelis Hoek, Tamm, both of Germany

[73] Assignee: Alcatel, Paris, France

[21] Appl. No.: 09/204,506

[22] Filed: Dec. 4, 1998

[30] Foreign Application Priority Data

Dec. 5, 1997 [DE] Germany .............. 197 53 932

[51] Int. Cl.$^6$ ........................ H01Q 3/22
[52] U.S. Cl. .................... 342/368; 342/378
[58] Field of Search .................. 342/368, 378

[56] References Cited

U.S. PATENT DOCUMENTS

| H374 | 11/1987 | Abo-Zena et al. ............ 342/378 |
| 4,754,282 | 6/1988 | Edelblute et al. . |
| 4,916,453 | 4/1990 | Costas . |
| 4,959,653 | 9/1990 | Ganz . |
| 4,965,732 | 10/1990 | Roy, III et al. . |
| 5,299,148 | 3/1994 | Gardner et al. ............ 364/574 |
| 5,359,333 | 10/1994 | Withers, Jr. . |
| 5,525,997 | 6/1996 | Kwon ............... 342/174 |

FOREIGN PATENT DOCUMENTS

| 37 28718 A1 | 3/1989 | Germany . |
| 43 14 739 A1 | 11/1993 | Germany . |
| 42 23 676 A1 | 1/1994 | Germany . |
| 43 13 627 C1 | 5/1994 | Germany . |
| 195 11 752 A1 | 10/1996 | Germany . |
| 195 11 751 A1 | 12/1996 | Germany . |
| 43 26 843 C2 | 11/1997 | Germany . |
| 2 072 986 | 10/1981 | United Kingdom . |

OTHER PUBLICATIONS

Simon C. Swales et al, "The Performance Enhancement of Multibeam Adaptive Base-Station Antennas for Cellular Land Mobile Radio Systems", IEEE Transactions on Vehicular Technology, vol. 39, No. 1, Feb. 1990, pp. 56–67.

J. S. Thompson et al, "Smart Antenna Arrays for CDMA Systems", IEEE Personal Communications, Oct. 1996, pp. 16–25.

S. Haykin, Adaptive Filter Theory, $3^{rd}$ Edition, 1996, Chapter 2.3, pp. 100–101.

J. B. Fraleigh et al, "Linear Algebra", 1995, Chapter 8.4, pp. 438–442.

*Primary Examiner*—Mark Hellner
*Attorney, Agent, or Firm*—Sughrue, Mion, Zinn, Macpeak & Seas, PLLC

[57] ABSTRACT

The determination of the direction of arrival of a radio signal by an antenna array connected to a base station of a radiocommunications system, particularly of an SDMA (Space Division Multiple Access) mobile radio system, is complicated by multipath. A method is known which uses the so-called ESPRIT algorithm and which is especially suited for a reliable estimation of direction, since the receive level (Sm) and the phase position ($\phi$m) are measured for each radiating element and entered in a symmetrical matrix (A) in order to then determine the direction of arrival by eigenvalue decomposition.

A simpler and faster method (100) is proposed which involves computing the eigenvector (Wn) corresponding to the dominant eigenvalue ($\lambda$1) of this matrix (A), which indicates the direction of arrival (DOA) of the strongest radio signal (S) (steps 130 and 140). The computationally intensive eigenvalue decomposition is eliminated.

10 Claims, 3 Drawing Sheets

110 — Radio signal $s(t) = \exp(-j\omega t)$.
Determine signal vector $x(t)$:
$x(t) = [\exp(-j\omega t), \exp(-j\omega t-\varphi 1), \exp(-j\omega t-\varphi 2) \ldots \exp(-j\omega t-\varphi m-1)]^t$ 120 — Form matrix A:

$$\begin{bmatrix} 1 & \exp(-j\varphi 1) & \exp(-j\varphi 2) & \ldots & \exp(-j\varphi m\text{-}1) \\ \exp(+j\varphi 1) & 1 & \exp(-j\varphi 1) & & \ldots \\ \exp(+j\varphi 2) & \exp(+j\omega t) & 1 & & \ldots \\ \ldots & \ldots & \ldots & & \ldots \\ \exp(+j\varphi m\text{-}1) & \ldots & \ldots & & 1 \end{bmatrix}$$

130 — Compute the eigenvector Wn for the dominant eigenvalue $\lambda 1$ of matrix A (see Fig. 2b).

140 — Point the antenna pattern in the direction of the computed eigenvector Wn.

Fig. 2a

METHOD OF DETERMINING THE DIRECTION OF ARRIVAL OF A RADIO SIGNAL, AS WELL AS RADIO BASE STATION AND RADIOCOMMUNICATIONS SYSTEM

BACKGROUND OF THE INVENTION

1. Field of the Invention

This invention relates to a method of determining the direction of arrival of a radio signal distorted by multipath and being received by an antenna array having a plurality of radiating elements, as set forth in the preamble of claim 1. The invention further relates to a radio base station using this method and to a radiocommunications system containing such a base station, as set forth in the preambles of the respective independent claims.

2. Description of the Related Art

U.S. Pat. No. 4,965,732 discloses a method of determining the direction of arrival of a radio signal distorted by multipath. The direction of arrival is determined using the so-called ESPRIT algorithm (ESPRIT: Estimation of Signal Parameters using Rotational Invariance Techniques). The radio signals received by an antenna array are evaluated as follows. First, data are collected for each radiating element which specify the receive level and the phase position. From these data, two matrices are formed, namely the so-called auto-covariance matrix and the so-called cross-covariance matrix. Next, by eigen-decomposition of the two matrices, the number of signal sources and the noise variance are determined, from which the so-called subspace rotation operator can be computed, which contains information on the direction of arrival (see U.S. Pat. No. 4,965,732, at the bottom of column 10). The decomposition of the matrices into their eigenvalues ("eigen-decomposition") is a computationally intensive operation, so that a powerful computer is needed to carry out the method. Since the method is used within a base station which is to receive radio signals from different directions by means of an antenna array, the cost and complexity of the base station are very high.

In an article by S. C. Swales et al, "The Performance Enhancement of Multibeam Adaptive Base-Station Antennas for Cellular Land Mobile Radio Systems", IEEE Transactions on Vehicular Technology, Vol. 39, No. 1, February 1990, pages 56–67, a base station is described which has an adaptive antenna array, a "smart" antenna. To steer the radiation pattern, use is made of a beamformer. The article deals essentially with the design of a cellular radio network in which base stations with such adaptive antenna arrays are used to improve the utilization of the radio resources. This is achieved by reusing one and the same radio frequency for different radio channels in several directions. To avoid interference between neighboring base stations, network planning is carried out with the aid of the "co-channel reuse ratio Q" (see page 59, left column). Nothing is said there about the pointing of the radiation patterns and the required determination of the direction of arrival.

An article by J. S. Thompson, "Smart Antenna Arrays for CDMA Systems", IEEE Personal Communications, October 1996, pages 16–25, describes antenna arrays in which a method of determining the direction of arrival of radio signals is carried out using the ESPRIT algorithm. Accordingly, the computational complexity of this method, too, is very large.

SUMMARY OF THE INVENTION

It is an object of the invention to improve the method referred to at the beginning by using simpler and faster algorithms to permit real-time computation of the direction of arrival employing simple processor technology, particularly digital signal processors. In addition, a base station for carrying out the improved method and a radiocommunications system containing such a base station are to be proposed.

The object is attained by a method with the features of claim 1 and by a base station and a radiocommunications system with the features of the respective independent claims.

Accordingly, to determine the direction of arrival, the measured receive levels and phases are entered in a symmetrical matrix having M columns and M rows, and the eigenvector corresponding to the dominant eigenvalue of this matrix is computed, which indicates the direction of arrival of the strongest radio signal.

Thus, instead of a complex eigen-decomposition, only the dominant eigenvalue which indicates the direction of arrival of the strongest signal is determined. This results in the formation of a radiation pattern with a main lobe which points in this direction, and side lobes can be largely suppressed. A simple implementation of the method is possible, for example, by use of the so-called power method, which is described below. The side lobes can be suppressed by so-called Tchebychev tapering.

Preferred embodiments of the invention are defined in the subclaims.

The dominant eigenvalue is estimated by determining the eigenvector of the matrix by calculating the Rayleigh quotient. The eigenvector can also be estimated very quickly by reading the contents of the first column of the matrix.

An iterative calculation of the eigenvector until the change in the Rayleigh quotient is less than a predetermined tolerance value permits a more exact estimation of the dominant eigenvalue within a time interval determined by the tolerance value and the calculating speed. The method can also be shortened by discontinuing the iteration after a predetermined number of cycles.

The last vector computed for the determination of the direction of arrival, which corresponds to the eigenvector to be found, is also evaluated to determine the direction of transmission, which is done by weighting this vector. The weight is determined from an offset between the transmit frequency and the receive frequency if the two frequencies differ (duplex transmission). This permits a fast calculation of the direction of transmission.

BRIEF DESCRIPTION OF THE DRAWINGS

The invention will become more apparent from the following description of an embodiment when taken in conjunction with the accompanying drawings, in which:

FIG. 2a is a flowchart showing the sequence of steps of a method in accordance with the invention.

DETAILED DESCRIPTION OF THE INVENTION

Figure 1:
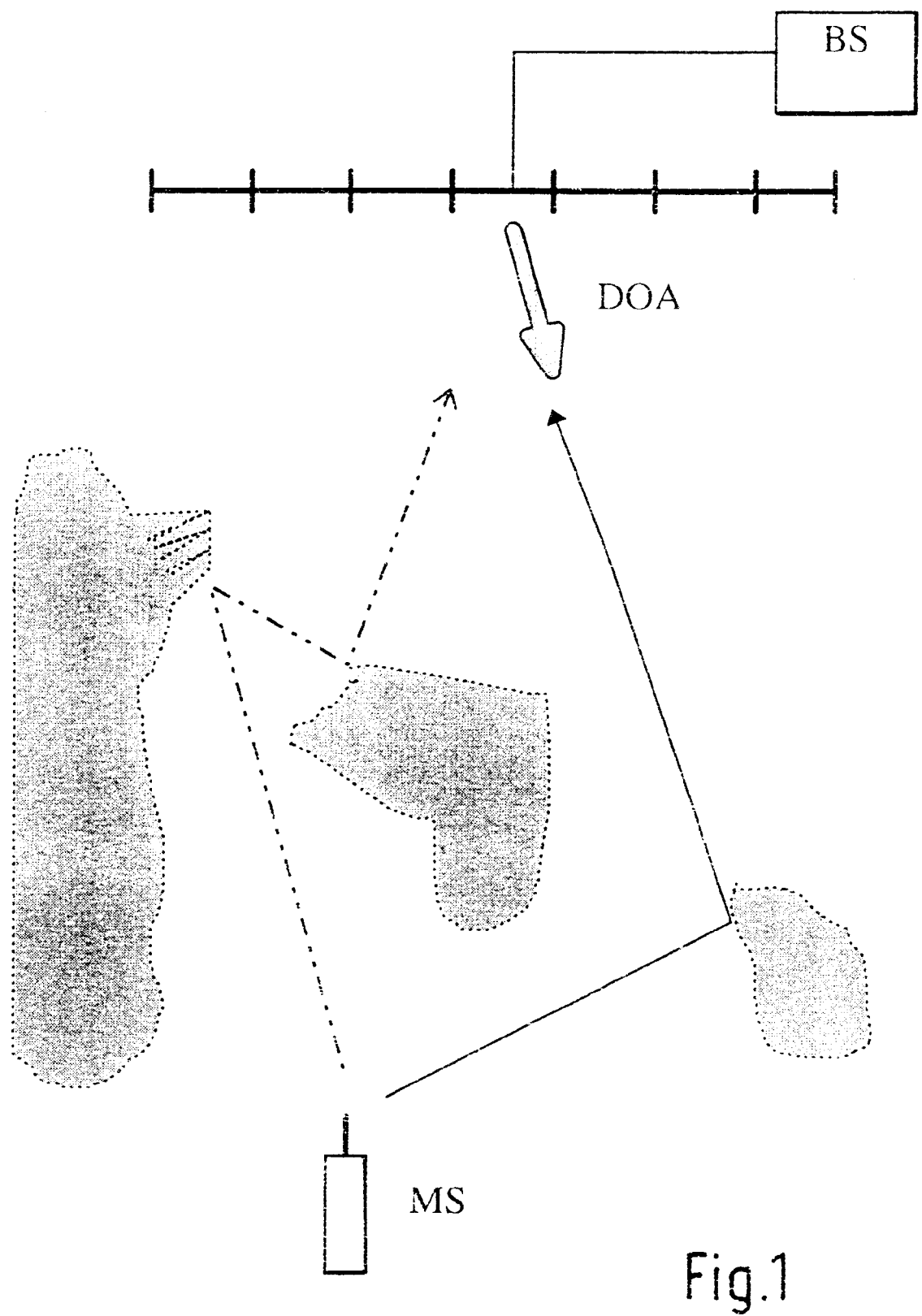
FIG. 1 shows schematically a base station with an associated antenna array and a mobile station in a typical multipath situation.

FIG. 1 shows schematically a typical scenario within a mobile-radio system. For the mobile-radio system, a base station BS with an antenna array and a mobile station MS are shown exemplarily. Between the two stations, radiocommunication is to take place, with the base station forming a radiation pattern pointed at the mobile station. Such a radiocommunications system, in which a directional radiation pattern pointed at each mobile station is formed by means of an antenna array is also referred to as an SDMA mobile-radio system (SDMA: Space Division Multiple Access).

FIG. 1 shows by way of example that due to shadowing, there is no direct radio path between the base station and the mobile station. The direction from the mobile station to the base station, i.e., the "uplink", is being considered here. Due to multipath propagation, the signals from the mobile station travel by a first indirect path (continuous arrow) and a second indirect path (dashed arrow). At the base station BS, the direction of arrival of DOA the signals is to be determined such that the signals are received as undistorted and with as little noise as possible. Since there is no line-of-sight link, the beam is to be pointed at the best possible indirect path, in this case the first path. The determination of the direction of arrival DOA also is to be used to determine the direction of transmission. The method according to the invention will now be described in more detail with reference to FIG. 2.

Figure 2B:
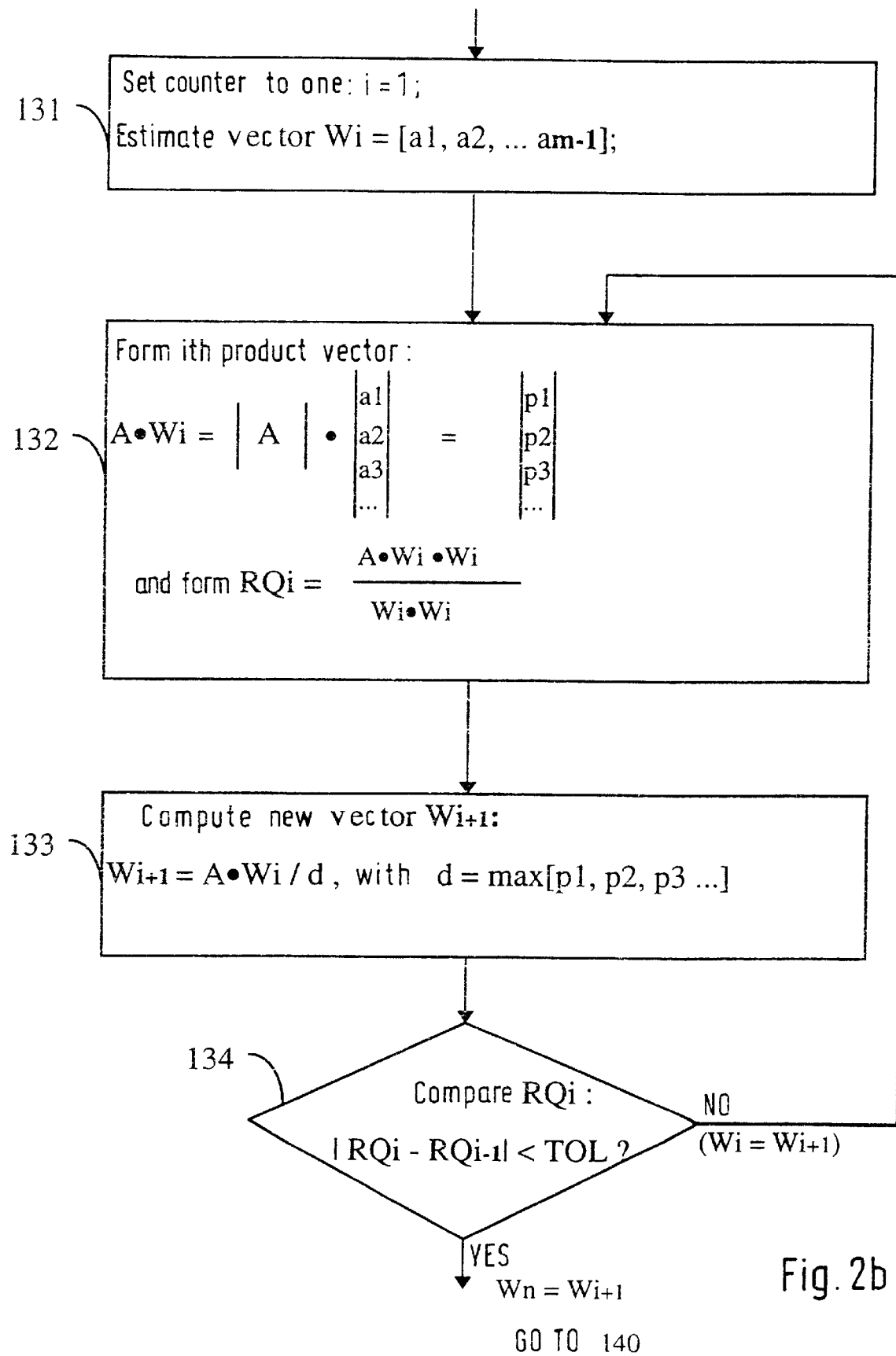
FIG. 2b is a flowchart showing several iteratively performed part steps of the method.

FIG. 2 shows two flowcharts, the first, FIG. 2a, illustrating the method 100, comprising steps 110 to 140, and FIG. 2b showing a subdivision of step 130 into part steps 131 to 133.

In steps 110 to 140, represented in FIG. 2a, the following operations are performed:

In the first step 110, the receive level and the phase position are determined for each radiating element. In this example, the antenna array has m=8 radiating elements. The radio signal transmitted by the mobile station, s(t)=exp(-jωt), is measured as a signal vector x(t) of the m=8 elements. To simplify matters, only the phases are considered here. Referred to the phase position of the first radiating element, the adjacent m−1 elements have the phase positions $\phi 1$, $\phi 2$, $\phi 3$, ..., $\phi m-1$.

In the next step 120, the symmetrical matrix A is formed, in which the different phases are entered. The matrix A is the covariance matrix for the vector x(t) and has m·m elements, i.e., in this example m·m=8·8=64 elements. The formation of a covariance matrix, which is not described here in detail, is familiar to those skilled in the art, for example from a book by S. Haykin, "Adaptive Filter Theory", 3rd Edition, published in 1996 by Prentice Hall, New Jersey, USA, Chapter 2.3, pages 100 and 101. The symmetry of the matrix A is characterized by the fact that the 8 row vectors correspond to the 8 column vectors except for a change of sign. The symmetrical matrix A is normalized, so that the unit element "1" is entered on the main diagonal. In the example shown, the first row vector of the matrix A contains the following elements: 1, exp(−j$\phi_1$), exp(−j$\phi_2$), ..., exp(−j$\phi_{m-1}$). The corresponding first column vector has the following 8 elements: 1, exp(+j$\phi_1$), exp(+j$\phi_2$), ..., exp(+j$\phi_{m-1}$).

In the next step 130, the eigenvector Wn corresponding to the dominant eigenvalue $\lambda_1$ of the matrix A is computed in order to point, in a next step 140, the radiation pattern in the direction of the computed eigenvector. In this example, the formation of the matrix A and the subsequent computation of the dominant eigenvalue $\lambda_1$ are carried out by the "power method", a method which is known per se from linear algebra and which is described, for example, in a book by J. B. Fraleigh et al entitled "Linear Algebra", published in 1995 (3rd Edition) by Addison-Wesley Publishing Company, Reading, Mass., USA, Chapter 8.4 on pages 438–442.

With reference to the "power method" described therein, the computation of the eigenvector Wn for the dominant eigenvalue $\lambda 1$ of the matrix A will now be described in more detail:

FIG. 2b shows schematically the division of step 130 of FIG. 2a into its three part steps 131 to 133. To compute the eigenvector Wn, in a first part step 131, a counter i is set to 1, and the ith vector Wi is estimated. The vector Wi has m−1=7 elements, namely A1, A2 to $A_{m-1}$ (m=8).

In a next part step 132, the ith product vector is formed by multiplying the matrix A by the estimated vector Wi. This multiplication A·Wi gives a column vector with m−1=8 elements P1, P2 to $P_{m-1}$ (m=8). The column vector is evaluated in a subsequent step 133.

Part step 132 also includes forming the ith Rayleigh quotient RQi. The Rayleigh quotient is known per se from linear algebra (see page 440 of the above-mentioned book by J. B. Fraleigh et al) and serves to iteratively approximate the dominant eigenvalue $\lambda_1$ of the matrix A.

In the next part step 133, a new vector, namely the i+1th vector $W_{i+1}$, is formed by dividing the previously computed product vector A·Wi by a factor d. This factor d corresponds to the maximum of the m−1 elements of the above-mentioned column vector. In other words: The new vector $W_{i+1}$ is formed by weighting the product vector with the inverse of the maximum of this product vector.

In the next step 134, a check is made to determine whether the last computed vector $W_{i+1}$ corresponds to the eigenvector Wn to be found. As a measure of this, the change in the Rayleigh quotient is used, i.e., the absolute value of the difference between the last computed Rayleigh quotient RQi and the previously computed Rayleigh quotient $RQ_{i-1}$. If the change is less than a predetermined tolerance value TOL, the last computed vector $W_{i+1}$ will be regarded as the required eigenvector Wn of the matrix A, and the radiation pattern will be pointed with the aid of step 140. If the change in the Rayleigh quotient is not less than the predetermined tolerance value TOL, the last computed vector $W_{i+1}$ will be put back into part step 132, i.e., part steps 132 to 134 are carried out again, with the vector Wi now corresponding to the last computed vector $W_{i+1}$.

Part steps 132 to 134 are iterated until the change in the Rayleigh quotient is less than the predetermined tolerance value TOL. In this manner, the computed eigenvector Wn approximates the actual eigenvector to an error predetermined by the tolerance value TOL.

It is also conceivable to limit the iteration shown in FIG. 2b by a predetermined number of cycles. This means that the iteration is discontinued after a predetermined number of cycles so as to limit the duration of the performance of the complete method to a maximum time interval.

The computed eigenvector Wn determines the direction of arrival of the strongest incoming signal. Thus, in the situation illustrated in FIG. 1, the radiation pattern will be pointed at the first radio path (continuous arrow). The main lobe of the antenna array thus points in the determined direction of arrival DOA, with side lobes being substantially reduced. Assuming that the signal received on the main lobe is at least 2 dB stronger than the signals received on the side lobes, it is sufficient for interference-free reception to point the main lobe in the direction of arrival described.

The side lobe reduction at the antenna array can be improved, for example, by "Tchebychev tapering", which is familiar to those skilled in the art. By this method, a very high attenuation of the side lobes can be achieved.

Based on the computed direction of arrival, it is also possible to determine the direction for the transmitted signals. In this example, the receive frequencies differ from the transmit frequencies by a predetermined duplex spacing of 45 MHz. On the different radio frequencies, different multipath propagation conditions result. This means that the situation for the uplink, shown schematically in FIG. 1, does not correspond to the same situation for the downlink. It is therefore particularly advantageous if the frequency spacing (duplex spacing) is taken into account in determining the direction of transmission. The direction of transmission is determined as follows: The eigenvector which determines the direction of arrival DOA is weighted with a vector which takes into account the frequency offset. In this manner, a transmitted-signal vector is computed for each radiating element.

The method described is very fast and does not require any costly and complex processor architectures but can be carried out on conventional digital signal processors or on similar processors. Therefore, the method is suitable for use not only in radio base stations but also in mobile stations fitted with antenna arrays.

In the method described above, an unmodulated sinusoidal signal was assumed. Persons skilled in the art will be able to replace the unmodulated signal by a modulated signal in the steps specified above.

The invention is particularly suited for use in SDMA mobile radio systems. It is also possible, however, to use the invention in other radiocommunications systems employing beam scanning, such as in radionavigation systems.

We claim:

1. A method of determining a direction of arrival of a radio signal distorted by multipath and being received by an antenna array having at least two radiating elements, said method comprising the steps of:
   collecting data for each of said at least two radiating elements, wherein said data specify a receive level and a phase position;
   entering said data in a matrix (A) having M columns and M rows; and
   computing a required eigenvector that corresponds to a dominant eigenvalue of said matrix (A), wherein said required eigenvector is computed in the following part steps:
   a) setting a counter (i) to 1 (i=1) and estimating a first vector ($W_i$, with i=1), which is to correspond to said required eigenvector, for said dominant eigenvalue of said matrix (A); and
   b) computing an ith product vector ($A \cdot W_i$) from said matrix (A) and said first vector ($W_i$), and computing a Rayleigh quotient (RQ) from the formula:

$RQ = (A \cdot W_i \cdot W_i)/(W_i \cdot W_i)$; and pointing a radiation pattern of said antenna array by evaluating a last computed vector ($W_{i=n}$), which is said required eigenvector, wherein said required eigenvector indicates said direction of arrival of a strongest radio signal.

2. A method as claimed in claim 1, wherein said first vector, which is to correspond to said required eigenvector, is determined by reading contents of a first column of said matrix (A).

3. A method as claimed in claim 1, wherein the step of computing a required eigenvector further comprises the part step of:
   c) determining a maximum (d) of the components of said product vector ($A \cdot W_i$), and computing a new vector ($W_{i+1}$) by weighting said product vector ($A \cdot W_i$) with the inverse of said maximum (i.e., $W_{i+1} = (1/d) \cdot A \cdot W_i$).

4. A method as claimed in claim 3, wherein said part steps b) and c) are iteratively repeated until said Rayleigh quotient changes by less than a predeterminable tolerance value.

5. A method as claimed in claim 3, wherein said part steps b) and c) are iteratively repeated until a predetermined number of cycles is reached.

6. A method as claimed in claim 1, further comprising the step of evaluating said last computed vector to determine a direction of transmission by weighting said last computed vector with a weight factor, wherein said weight factor is determined from an offset between a transmitted frequency and a received frequency.

7. A radio base station comprising:
   an antenna array having at least two radiating elements for receiving a radio signal distorted by multipath;
   an evaluating device connected to said antenna array, wherein said evaluating device collects data for each of said at least two radiating elements, and wherein said data specify a receive level and a phase position for determining a direction of arrival of said radio signal; and
   a memory device, connected to said evaluating device, for storing said data in the form of a symmetrical matrix (A) having M columns and M rows;
   wherein said evaluating device computes an eigenvector corresponding to a dominant eigenvalue of said symmetrical matrix (A) in the following manner:
   a) setting a counter (i) to 1 (i=1) and estimating a first vector ($W_i$, with i=1), which is to correspond to said eigenvector, for said dominant eigenvalue of said matrix (A); and
   b) computing an ith product vector ($A \cdot W_i$) from said matrix (A) and said first vector ($W_i$), and computing a Rayleigh quotient (RQ) from the formula:

$RQ = (A \cdot W_i \cdot W_i)/(W_i \cdot W_i)$;

wherein said radio base station points a radiation pattern of said antenna array by evaluating a last computed vector ($W_{i=n}$), which is said eigenvector, and wherein said eigenvector indicates said direction of arrival of a strongest radio signal.

8. A radio base station as claimed in claim 7, wherein said evaluating device computes said eigenvector by further determining a maximum (d) of the components of said product vector ($A \cdot W_i$), and computing a new vector ($W_{i+1}$) by weighting said product vector ($A \cdot W_i$) with the inverse of said maximum (i.e., $W_{i+1} = (1/d) \cdot A \cdot W_i$).

9. A radiocommunications system comprising at least one radio base station, wherein said at least one radio base station comprises:
   an antenna array having at least two radiating elements for receiving a radio signal distorted by multipath;
   an evaluating device connected to said antenna array, wherein said evaluating device collects data for each of said at least two radiating elements, and wherein said data specify a receive level and a phase position for determining a direction of arrival of said radio signal; and
   a memory device, connected to said evaluating device, for storing said data in the form of a symmetrical matrix (A) having M columns and M rows;
   wherein said evaluating device computes an eigenvector corresponding to a dominant eigenvalue of said symmetrical matrix (A) in the following manner:

a) setting a counter (i) to 1(i=1) and estimating a first vector ($W_i$, with i=1), which is to correspond to said eigenvector, for said dominant eigenvalue of said matrix (A); and b) computing an ith product vector ($A \cdot W_i$) from said matrix (A) and said first vector ($W_i$), and computing a Rayleigh quotient (RQ) from the formula:

$$RQ = (A \cdot W_i \cdot W_i)/(W_i \cdot W_i);$$

wherein said at least one radio base station points a radiation pattern of said antenna array by evaluating a last computed vector ($W_{i-1}$), which is said eigenvector, and wherein said eigenvector indicates said direction of arrival of a strongest radio signal.

10. A radiocommunications system as claimed in claim 9, wherein said evaluating device computes said eigenvector by further determining a maximum (d) of the components of said product vector ($A \cdot W_i$), and computing a new vector ($W_{i+1}$) by weighting said product vector ($A \cdot W_i$) with the inverse of said maximum (i.e., $W_{i+1} = (1/d) \cdot A \cdot W_i$).

* * * * *